(12) United States Patent
Luo et al.

(10) Patent No.: US 9,052,447 B2
(45) Date of Patent: Jun. 9, 2015

(54) OPTICAL DEVICE WITH ECHELLE GRATING AND WAVEFRONT TAILORING

(75) Inventors: Ying L. Luo, San Diego, CA (US); Ashok V. Krishnamoorthy, San Diego, CA (US); Xuezhe Zheng, San Diego, CA (US); Guoliang Li, San Diego, CA (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 599 days.

(21) Appl. No.: 13/307,298

(22) Filed: Nov. 30, 2011

(65) Prior Publication Data
US 2013/0136389 A1    May 30, 2013

(51) Int. Cl.
| | |
|---|---|
| G02B 6/34 | (2006.01) |
| G02B 6/12 | (2006.01) |
| G02B 6/124 | (2006.01) |
| G02B 6/126 | (2006.01) |
| G02B 6/28 | (2006.01) |
| G02B 6/293 | (2006.01) |

(52) U.S. Cl.
CPC ............ *G02B 6/12007* (2013.01); *G02B 6/124* (2013.01); *G02B 6/126* (2013.01); *G02B 6/2813* (2013.01); *G02B 6/29326* (2013.01)

(58) Field of Classification Search
CPC .. G02B 6/29311; G02B 6/356; G02B 6/2931; G02B 6/3548; G02B 6/3512; G02B 6/29313; G02B 6/3588; G02B 6/0026; G02B 6/29395; G02B 6/34; G02B 6/12007; G02B 6/2938; G02B 6/3534; G02B 6/29326; G02B 5/18; G02B 2006/12107
USPC ................... 385/37, 18, 10, 11, 15; 359/566; 398/79, 87
See application file for complete search history.

(56) References Cited

U.S. PATENT DOCUMENTS

| | | | | |
|---|---|---|---|---|
| 6,097,863 | A * | 8/2000 | Chowdhury | ............ 385/37 |
| 6,657,723 | B2 * | 12/2003 | Cohen et al. | .......... 356/328 |
| 2002/0131685 | A1 * | 9/2002 | He et al. | ............ 385/24 |

* cited by examiner

*Primary Examiner* — Ryan Lepisto
*Assistant Examiner* — Erin Chiem
(74) *Attorney, Agent, or Firm* — Park, Vaughan, Fleming & Dowler LLP; Steven E. Stupp

(57) ABSTRACT

An optical de-MUX includes a sub-wavelength grating that magnifies an input optical signal. In particular, along a direction perpendicular to a propagation direction of the optical signal, the sub-wavelength grating has a spatially varying effective index of refraction that is larger at a center of the sub-wavelength grating than at an edge of the sub-wavelength grating. Moreover, the optical de-MUX includes an optical device that images and diffracts the optical signal using a reflective geometry, and which provides different diffraction orders to output ports. For example, the optical device may include an echelle grating.

13 Claims, 5 Drawing Sheets

OPTICAL DEVICE WITH ECHELLE GRATING AND WAVEFRONT TAILORING

GOVERNMENT LICENSE RIGHTS

This invention was made with Government support under Agreement No. HR0011-08-9-0001 awarded by DARPA. The Government has certain rights in the invention.

BACKGROUND

1. Field

The present disclosure generally relates to optical devices. More specifically, the present disclosure relates to an optical de-multiplexer (de-MUX) that includes a sub-wavelength grating and a compact echelle grating.

2. Related Art

Integrated silicon photonics is a promising new technology that provides a number of advantages for chip-level communication, such as very high index contrast and compatibility with CMOS fabrication technology. Ongoing research into integrated silicon photonics is focusing on opportunities to provide: low latency, high bandwidth, high density, and low power consumption. To date, several key active elements, including silicon lasers, modulators, and photodetectors, have been realized in silicon using low-cost CMOS compatible processes. However, a wavelength filter (such as an optical de-MUX), which can be used in wavelength division multiplexing (WDM), has not been developed yet.

In a high-data-rate WDM application, an ideal wavelength filter has: low loss, low crosstalk, and a small footprint. In principle, a number of optical de-MUX designs can be integrated with CMOS circuits, including: Mach-Zehnder (MZ) lattice filters, ring resonators, arrayed waveguide gratings (AWG) and planar concave gratings (echelle gratings). Echelle gratings, which image and diffract optical signals, are particularly interesting because they can be designed to have: low optical crosstalk, fixed channel spacing, reduced tuning and monitoring requirements, and low on-chip optical loss.

However, echelle grating designs with high optical performance (such as low optical crosstalk and image aberrations) often have larger footprints. For example, image aberrations associated with grating facets far from the center of an echelle grating are one of the main contributors to optical crosstalk. As a consequence, wider entrance and exit apertures along the Rowland circle are usually required in order to reduce the input beam divergence in the free-propagation region of an echelle grating. In addition, smaller diffraction angles (less than 40°) are typically used to avoid illuminating grating facets further away from the center of the echelle grating. Given linear dispersion, these design choices result in a significantly longer focal length for the echelle grating and, thus, the device size or footprint is significantly increased.

Increasing the size of echelle gratings usually increases their manufacturing cost. In addition, larger echelle gratings are often excluded from size-sensitive optical links. Thus, echelle gratings are usually not used in systems that only include a few WDM channels (e.g., 4 or 8 carrier wavelengths).

Hence, what is needed is an optical de-MUX that does not suffer from the above-described problems.

SUMMARY

One embodiment of the present disclosure provides an optical de-multiplexer (de-MUX). This optical de-MUX includes an input port that receives an optical signal (for example, via an optical waveguide) and a sub-wavelength grating that magnifies the optical signal. Note that, along a direction perpendicular to a propagation direction of the optical signal, an effective index of refraction of the sub-wavelength grating is larger at a center of the sub-wavelength grating than at an edge of the sub-wavelength grating, and that a sign of the magnification depends on a direction of propagation of the optical signal (thus, the sub-wavelength grating magnifies or demagnifies depending on the direction of propagation). Moreover, the optical de-MUX includes an optical device that images and diffracts the optical signal using a reflective geometry so that different diffraction orders of the optical device propagate through the sub-wavelength grating, and which provides the different diffraction orders to output ports (which may include additional optical waveguides).

Furthermore, an incidence angle associated with the given diffraction order may be different than a diffraction angle associated with the given diffraction order. Alternatively or additionally, the optical device may include a diffraction grating on a curved surface.

Note that a grating pitch of the diffraction grating may be greater than or equal to 20 μm. Moreover, the optical device may include an echelle grating. In some embodiments, a Rowland radius of the echelle grating is less than 1 mm.

Additionally, in some embodiments the optical de-MUX includes: a substrate; a buried-oxide layer disposed on the substrate; and a semiconductor layer disposed on the buried-oxide layer, where the optical device is included in the semiconductor layer. For example, the substrate may include a semiconductor. In particular, the substrate, the buried-oxide layer and the semiconductor layer may comprise a silicon-on-insulator technology.

In some embodiments, the optical de-MUX includes a polarization compensator proximate to the optical device, where the polarization compensator compensates for variation in a polarization of the optical signal.

Another embodiment provides an optical MUX.

Another embodiment provides a system that includes the optical de-MUX or the optical MUX.

Another embodiment provides a method for de-multiplexing the optical signal. During the method, the optical signal is received via the optical waveguide. Then, the optical signal is magnified using the sub-wavelength grating, where, along the direction perpendicular to the propagation direction of the optical signal, the effective index of refraction of the sub-wavelength grating is larger at the center of the sub-wavelength grating than at the edge of the sub-wavelength grating. Moreover, the optical signal is imaged and diffracted using the optical device having the reflective geometry, and the imaged and diffracted optical signal is demagnified using the sub-wavelength grating. Furthermore, the imaged and diffracted optical signal is output at the additional optical waveguides.

Figure 1:
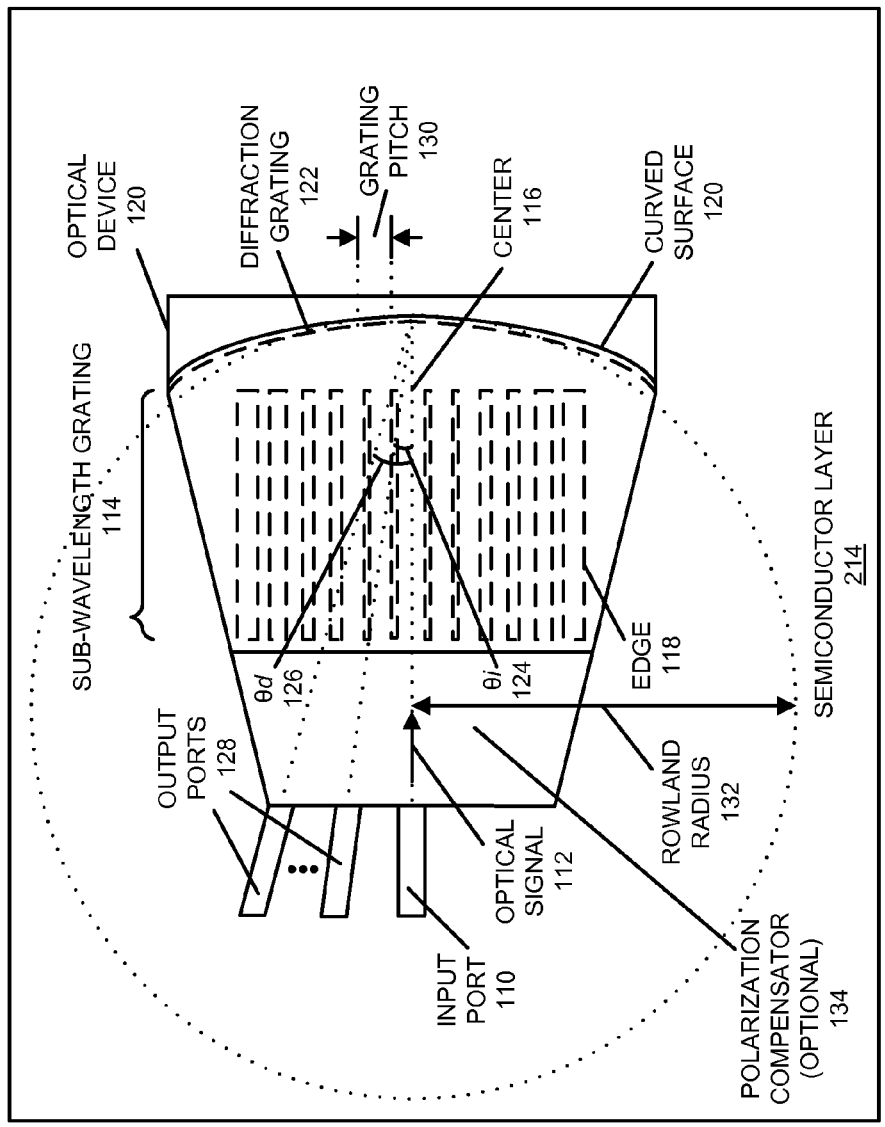
FIG. 1 is a block diagram illustrating a top view of an optical de-multiplexer (de-MUX) in accordance with an embodiment of the present disclosure.

Table 1 provides design parameters for an echelle grating in accordance with an embodiment of the present disclosure.

Note that like reference numerals refer to corresponding parts throughout the drawings. Moreover, multiple instances of the same part are designated by a common prefix separated from an instance number by a dash.

DETAILED DESCRIPTION

Embodiments of an optical de-multiplexer (de-MUX), a system that includes the optical de-MUX, and a method for de-multiplexing an optical signal are described. This optical de-MUX includes a sub-wavelength grating that magnifies an input optical signal. In particular, along a direction perpendicular to a propagation direction of the optical signal, the sub-wavelength grating has a spatially varying effective index of refraction that is larger at a center of the sub-wavelength grating than at an edge of the sub-wavelength grating. Moreover, the optical de-MUX includes an optical device that images and diffracts the optical signal using a reflective geometry, and which provides different diffraction orders to output ports. For example, the optical device may include an echelle grating.

By tailoring the wavefront using an artificial slab lens formed by the sub-wavelength grating, the optical de-MUX may have a reduced size and, thus, a reduced manufacturing cost relative to an optical de-MUX that includes a conventional echelle-grating design. In addition, the reduced size of the optical de-MUX may facilitate its use in size-sensitive optical links.

We now describe embodiments of the optical de-MUX. FIG. 1 presents a block diagram illustrating a top view of optical de-MUX 100. This optical de-MUX includes an input port 110 that receives an optical signal 112 (for example, via an optical waveguide). For example, optical signal 112 may be associated with a predefined channel spacing (such as those used in wavelength division multiplexing).

Figure 2:
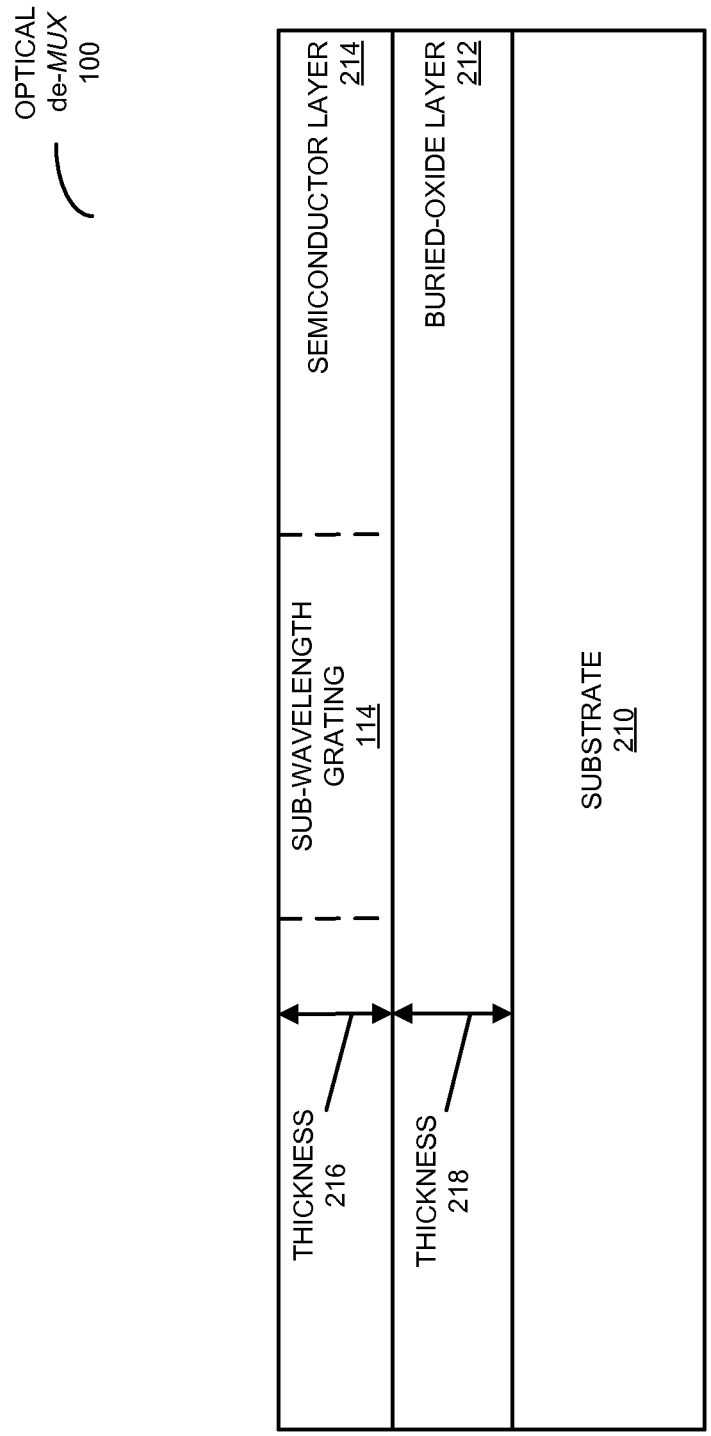
FIG. 2 is a block diagram illustrating a side view of the optical de-MUX in accordance with an embodiment of the present disclosure.

Moreover, optical de-MUX 100 includes a sub-wavelength grating 114 that magnifies the optical signal, thereby reducing the divergence of optical signal 112 in the free-propagation region of optical de-MUX 100. In particular, sub-wavelength patterns may be defined and etched in the free-propagation region of optical de-MUX 100, such as in semiconductor layer 214 (FIG. 2). These nanophotonic grating patterns in sub-wavelength grating 114 may be sufficiently small to suppress all but the $0^{th}$-order diffraction, i.e., the reflected or transmitted light. Moreover, the effective index of refraction can be modulated in this artificial slab material to create a so-called 'meta'-material lens with light-focusing functionality. For example, sub-wavelength grating 114 may have a graded index-of-refraction profile in which the local index of refraction is modulated by controlling the duty cycle of the sub-wavelength patterns so that there is a quadratic effective index-of-refraction profile in the transverse direction of sub-wavelength grating 114. Thus, along a direction perpendicular to a propagation direction of optical signal 112 (i.e., the transverse direction), an effective index of refraction of sub-wavelength grating 114 is larger at a center 116 of sub-wavelength grating 114 than at an edge 118 of sub-wavelength grating 114. Note that a sign of the magnification depends on a direction of propagation of optical signal 112.

Therefore, sub-wavelength grating 114 magnifies optical signal 112 when incident from input port 110 and, as described below, demagnifies different diffraction orders output by optical device 120.

Furthermore, optical de-MUX 100 includes optical device 120 that images and diffracts optical signal 112 using a reflective geometry so that different diffraction orders of optical device 120 propagate through sub-wavelength grating 114, and which provides the different diffraction orders to output ports 128 (which may include additional optical waveguides). For example, optical device 120 may include a diffraction grating 122 on a curved surface having a radius of twice Rowland radius 132, such as an echelle grating. Thus, an incidence angle ($\theta_i$) 124 associated with the given diffraction order may be different than a diffraction angle ($\theta_d$) 126 associated with the given diffraction order. Note that grating pitch 130 of diffraction grating 122 may be greater than or equal to 20 μm and/or Rowland radius 132 may be less than 1 mm.

Because diffraction grating 122 is defined on a concave mirror, optical signal 112 is reflected and refocused onto output ports 128. Thus, optical device 120 is equivalent to a positive lens. However, the positive-positive lens combination of sub-wavelength grating 114 and optical device 120 has an effective focal length that is much smaller than Rowland radius 132, without adversely impacting the performance of optical de-MUX 100. This can facilitate a significant reduction in the size of optical device 120.

In some embodiments, optical de-MUX 100 includes an optional polarization compensator 134 proximate to optical device 120, where optional polarization compensator 134 compensates for variation in a polarization of optical signal 112.

Optical de-MUX 100 may be implemented using silicon-on-insulator (SOI) technology. This is illustrated in FIG. 2, which presents a block diagram illustrating a side view of optical de-MUX 100. In particular, optical de-MUX may include: a substrate 210; a buried-oxide layer 212 disposed on substrate 210; and a semiconductor layer 214 disposed on buried-oxide layer 212, where at least sub-wavelength grating 114 is included in semiconductor layer 214. For example, substrate 210 and/or semiconductor layer 214 may include a semiconductor, such as silicon.

In an exemplary embodiment, optical signal 112 (FIG. 1) has wavelengths between 1.1-1.7 μm, such as an optical signal having a fundamental wavelength of 1.3 or 1.55 μm. Moreover, semiconductor layer 214 may have a thickness 216 that is less than 1 μm (such as 0.25-0.3 μm). Furthermore, buried-oxide layer 212 may have a thickness 218 between 0.3 and 3 μm (such as 0.8 μm).

The parameters for an exemplary design of an echelle grating are provided in Table 1. Furthermore, the pitch of sub-wavelength grating 114 (FIG. 1) may be 200-300 nm, and the duty cycle of the sub-wavelength patterns may vary from 20% space and 80% silicon near center 116 (FIG. 1) to 80% space and 20% silicon near edge 118 (FIG. 1).

TABLE 1

| | |
|---|---|
| Channel count | 8 |
| Channel spacing (nm) | 1.6 |
| Optical crosstalk (dB) | 20-25 |
| Footprint (μm$^2$) | 500 × 200 |
| Insertion loss | <3 dB |
| Carrier wavelength (nm) | 1550 |
| FSR (nm) | 12.8 |
| Thickness 216 (nm) | 300 |
| Diffraction order | 90 |
| Effective focal length (μm) | 150 |
| Grating pitch (μm) | 25 |

We now further describe the design and operation of the optical de-MUX. The input light passing through the silicon slab in the sub-wavelength grating in the free-propagation region of an echelle grating may experience the smoothed-out, averaged optical properties of the sub-wavelength grating. Thus, the sub-wavelength grating may be represented as a locally homogenous effective medium with optical properties that are determined by the geometry of the sub-wavelength grating. By locally changing the pitch and/or the duty cycle of the sub-wavelength grating, the wavefront phase properties of the incident light beam can be sculpted. For example, by giving the sub-wavelength grating a quadratic index-of-refraction profile, a graded index (GRIN) focusing lens can be created.

Figure 3:
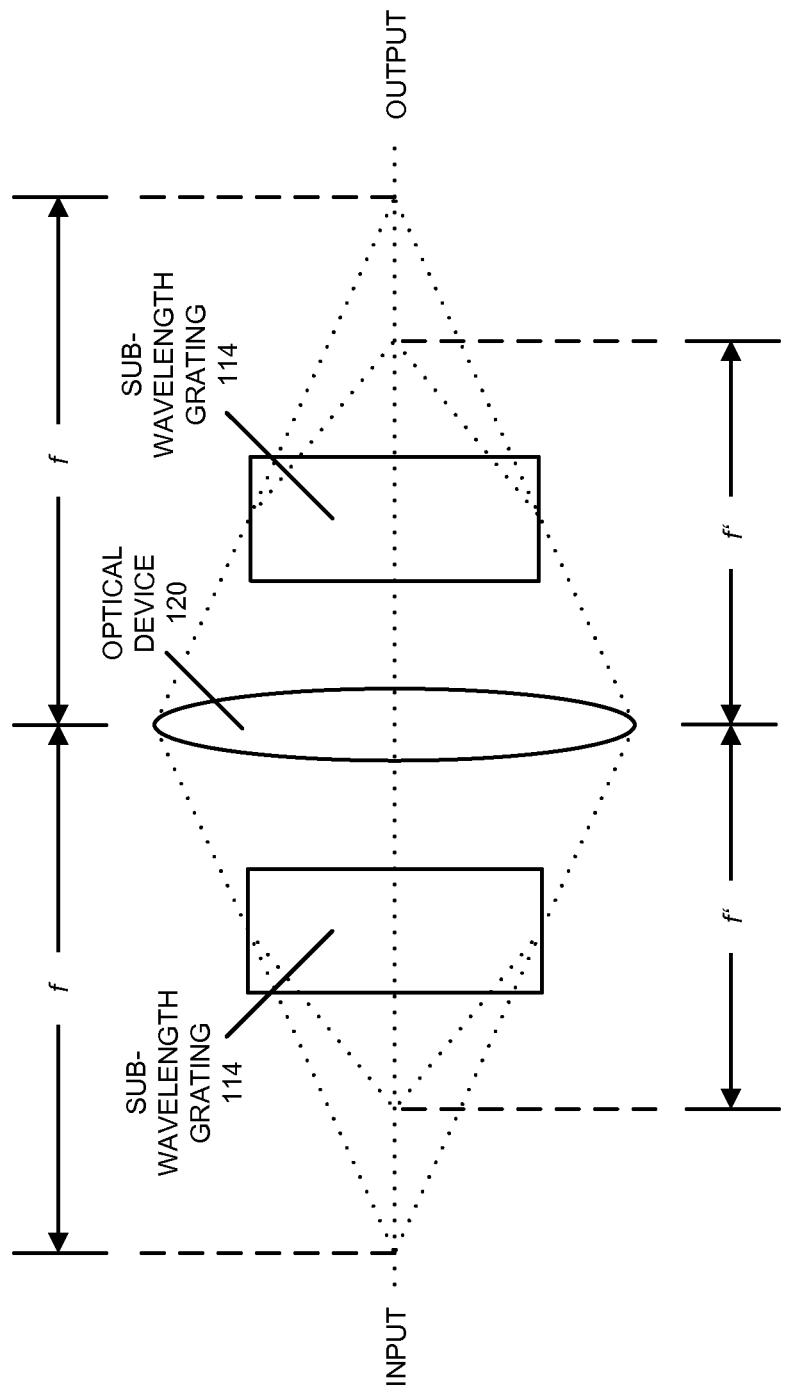
FIG. 3 is a diagram illustrating an equivalent lens schematic of the optical de-MUX of FIGS. 1 and 2 in accordance with an embodiment of the present disclosure.

Moreover, because the echelle grating is formed on a concave mirror, which provides a folded beam path to the incident light, the input light passes through the sub-wavelength grating twice. Therefore, as shown in FIG. 3, an equivalent lens schematic of optical de-MUX 100 (FIGS. 1 and 2) includes three positive lenses, which provides a modified lens and mirror effect. Using a GRIN focusing-lens approximation, the effective focal length and working distance of the lens associated with the sub-wavelength grating can be determined from the grating geometry. Then, the combined focal length (f') of the echelle grating/concave mirror and the sub-wavelength-grating lens can be expressed as $$\frac{1}{f'} = \frac{1}{f} + \frac{1}{f_{SWG}} - \frac{d}{f \cdot f_{SWG}},$$

where f is the focal length of the echelle grating/concave mirror, $f_{SWG}$ is the focal length of the sub-wavelength-grating lens, and d is the distance between the echelle grating/concave mirror and the sub-wavelength-grating lens. Note that, when f is larger than the separation between the two lenses (i.e., d), the combined positive-positive lens has a shorter focal length f' than f. For the previously described GRIN-lens structure, the sub-wavelength grating fills most of the free-propagation region so this condition is naturally satisfied. As a consequence, the input and output apertures or ports are moved away from the Rowland circle and placed along a new circle with radius R' equal to the combined lens focal length f'. Thus, using the sub-wavelength grating, the incident wavefront can be tailored with focusing effect in the free-propagation region, which in turn reduces the required propagation length and, therefore, the total footprint of the optical de-MUX can be reduced.

Note that, in order to match the reduced size of the optical-waveguide circle (which is defined by radius R'), the spacing of the optical waveguides at the output ports needs to be decreased based on the linear dispersion of the echelle grating, which can be expressed as $$LD = 2R' \frac{\partial \theta_d}{\partial \lambda},$$

where LD is the linear dispersion and λ is the operating wavelength.

In many integrated applications, it is desirable to have the chip size as small as possible. This can be facilitated by the optical de-MUX. Moreover, the sub-wavelength-grating lens can be designed to have high numerical aperture (NA) to capture all the incident light from the narrow optical-waveguide aperture or input port. As a consequence, optical-waveguide tapers between the input port and the free-propagation region may be eliminated because the divergence of the input light is reduced by the sub-wavelength grating (and, thus, optical crosstalk and image aberration is eliminated or reduced). When wide tapers are no longer needed, the input and output optical waveguides can be placed as closely as possible, which is typically determined by the Airy disk diameter or the physical size of the optical waveguides. In turn, this minimum optical-waveguide spacing may determine the lower limit of the device size. For an echelle-grating optical de-MUX fabricated using SOI technology, a 5× footprint reduction can be achieved (i.e., R' may be between 100-500 μm).

Because sub-wavelength gratings can be designed to function as artificial materials with inter-mediated effective indices of refraction, in some embodiments the sub-wavelength-grating lens may have a cylindrical shape (instead of a spherical shape), which may provide improved focusing with reduced image aberrations. In addition, the sub-wavelength grating may be locally defined so that it preferentially guides light within the echelle grating to favor certain output ports or diffraction orders.

Note that, in contrast with typical sub-wavelength gratings, which often require the duty cycle and/or period to be accurately patterned to obtain a desired phase response, the fabrication requirements of the optical de-MUX may be less stringent. Furthermore, in addition to the averaging effect from the concave echelle grating, sidewall roughness and facet verticality in the sub-wavelength grating may be significantly improved when implemented using SOI technology because of the much shallower etch depths. As a consequence, the optical performance of the optical de-MUX may not be degraded by material losses and roughness-related scattering.

Figure 4:
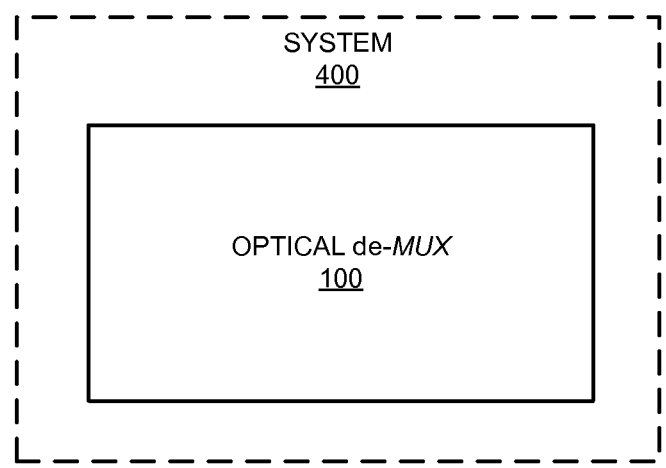
FIG. 4 is a block diagram illustrating a system that includes the optical de-MUX of FIGS. 1 and 2 in accordance with an embodiment of the present disclosure.

Optical de-MUX 100 (FIGS. 1 and 2) may be used in a variety of applications. This is shown in FIG. 4, which presents a block diagram illustrating a system 400 that includes optical de-MUX 100 (FIGS. 1 and 2). System 400 may include: a VLSI circuit, a switch, a hub, a bridge, a router, a communication system, a storage area network, a data center, a network (such as a local area network), and/or a computer system (such as a multiple-core processor computer system). Furthermore, the computer system may include, but is not limited to: a server (such as a multi-socket, multi-rack server), a laptop computer, a communication device or system, a personal computer, a work station, a mainframe computer, a blade, an enterprise computer, a data center, a portable-computing device, a tablet computer, a supercomputer, a network-attached-storage (NAS) system, a storage-area-network (SAN) system, and/or another electronic computing device. Note that a given computer system may be at one location or may be distributed over multiple, geographically dispersed locations.

Moreover, optical de-MUX 100 (FIGS. 1 and 2), as well as system 400, may include fewer components or additional components. Although these embodiments are illustrated as having a number of discrete items, these optical components, integrated circuits and the system are intended to be functional descriptions of the various features that may be present rather than structural schematics of the embodiments described herein. Consequently, in these embodiments two or more components may be combined into a single component, and/or a position of one or more components may be changed. In addition, functionality in the preceding embodiments of the integrated circuits and the system may be implemented more in hardware and less in software, or less in hardware and more in software, as is known in the art. For example, functionality may be implemented in one or more application-specific integrated circuits (ASICs) and/or one or more digital signal processors (DSPs).

While the preceding embodiments have been illustrated with an optical de-MUX, these approaches may also be used in an optical MUX.

Figure 5:
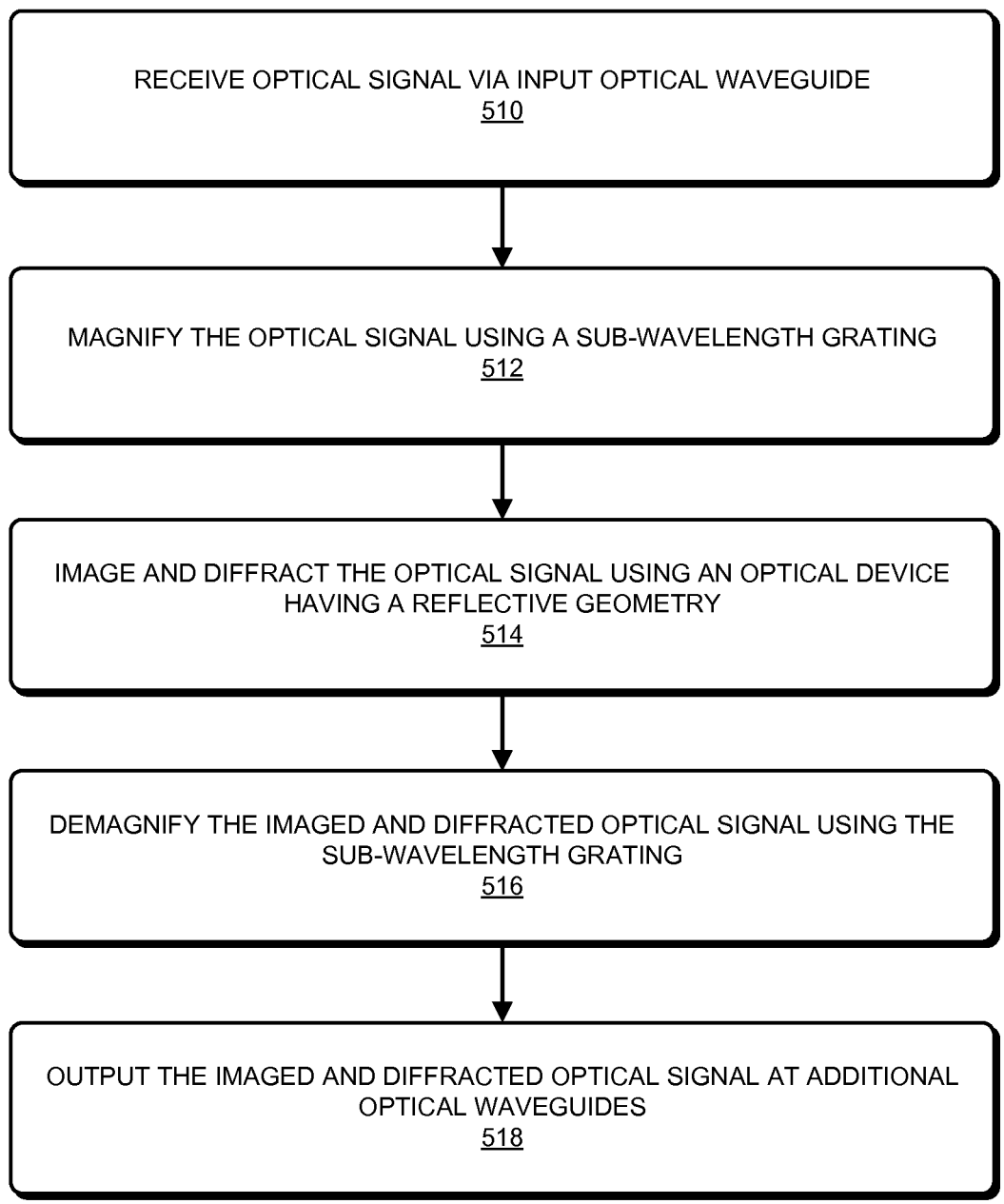
FIG. 5 is a flow chart illustrating a method for de-multiplexing an optical signal in accordance with an embodiment of the present disclosure.

We now describe embodiments of the method. FIG. 5 presents a flow chart illustrating a method 500 for de-multiplexing an optical signal, which may be performed by optical de-MUX 100 (FIGS. 1 and 2). During the method, the optical signal is received via an optical waveguide (operation 510). Then, the optical signal is magnified using a sub-wavelength grating (operation 512), where, along a direction perpendicular to a propagation direction of the optical signal, an effective index of refraction of the sub-wavelength grating is larger at a center of the sub-wavelength grating than at an edge of the sub-wavelength grating. Moreover, the optical signal is imaged and diffracted using an optical device having a reflective geometry (operation 514), and the imaged and diffracted optical signal is demagnified using the sub-wavelength grating (operation 516). Furthermore, the imaged and diffracted optical signal is output at additional optical waveguides (operation 518).

In some embodiments of method 400 there are additional or fewer operations. Moreover, the order of the operations may be changed, and/or two or more operations may be combined into a single operation.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A de-multiplexer, comprising:
an input port configured to couple to an optical waveguide to receive an optical signal;
a sub-wavelength grating, optically coupled to the input port, configured to magnify the optical signal, wherein, along a direction perpendicular to a propagation direction of the optical signal, an effective index of refraction of the sub-wavelength grating is larger at a center of the sub-wavelength grating than at an edge of the sub-wavelength grating, and wherein a sign of the magnification depends on a direction of propagation of the optical signal;
an optical device, optically coupled to the sub-wavelength grating, configured to image and diffract the optical signal using a reflective geometry so that different diffraction orders of the optical device propagate through the sub-wavelength grating, wherein the optical device includes a diffraction grating on a curved surface; and
output ports, optically coupled to the sub-wavelength grating, configured to couple the different diffraction orders of the optical device to additional optical waveguides.

2. The de-multiplexer of claim 1, wherein an incidence angle associated with a given diffraction order is different than a diffraction angle associated with the given diffraction order.

3. The de-multiplexer of claim 1, wherein a grating pitch of the diffraction grating is greater than or equal to 20 μm.

4. The de-multiplexer of claim 1, further comprising:
a substrate;
a buried-oxide layer disposed on the substrate; and
a semiconductor layer disposed on the buried-oxide layer, wherein the optical device is included in the semiconductor layer.

5. The de-multiplexer of claim 4, wherein the substrate includes a semiconductor.

6. The de-multiplexer of claim 4, wherein the substrate, the buried-oxide layer and the semiconductor layer comprise a silicon-on-insulator technology.

7. The de-multiplexer of claim 1, further comprising a polarization compensator proximate to the optical device, wherein the polarization compensator is configured to compensate for variation in a polarization of the optical signal.

8. A system, comprising:
a first system component coupled to an optical waveguide;
a de-multiplexer, wherein the de-multiplexer includes:
an input port configured to couple to the optical waveguide to receive an optical signal from the first system component;
a sub-wavelength grating, optically coupled to the input port, configured to magnify the optical signal, wherein, along a direction perpendicular to a propagation direction of the optical signal, an effective index of refraction of the sub-wavelength grating is larger at a center of the sub-wavelength grating than at an edge of the sub-wavelength grating, and wherein a sign of the magnification depends on a direction of propagation of the optical signal;
an optical device, optically coupled to the sub-wavelength grating, configured to image and diffract the optical signal using a reflective geometry so that different diffraction orders of the optical device propagate through the sub-wavelength grating, wherein the optical device includes a diffraction grating on a curved surface; and
output ports, optically coupled to the sub-wavelength grating, configured to couple the different diffraction orders of the optical device to additional optical waveguides; and
a second system component coupled to at least one of the additional optical wave guides.

9. The system of claim 8, wherein an incidence angle associated with a given diffraction order is different than a diffraction angle associated with the given diffraction order.

10. The system of claim 8, wherein the de-multiplexer further includes:
a substrate;
a buried-oxide layer disposed on the substrate; and
a semiconductor layer disposed on the buried-oxide layer, wherein the optical device is included in the semiconductor layer.

11. The system of claim 10, wherein the substrate includes a semiconductor.

12. The system of claim 10, wherein the substrate, the buried-oxide layer and the semiconductor layer comprise a silicon-on-insulator technology.

13. The system of claim 8, wherein the de-multiplexer further includes a polarization compensator proximate to the optical device, wherein the polarization compensator is configured to compensate for variation in a polarization of the optical signal.

\* \* \* \* \*